Figure 1:
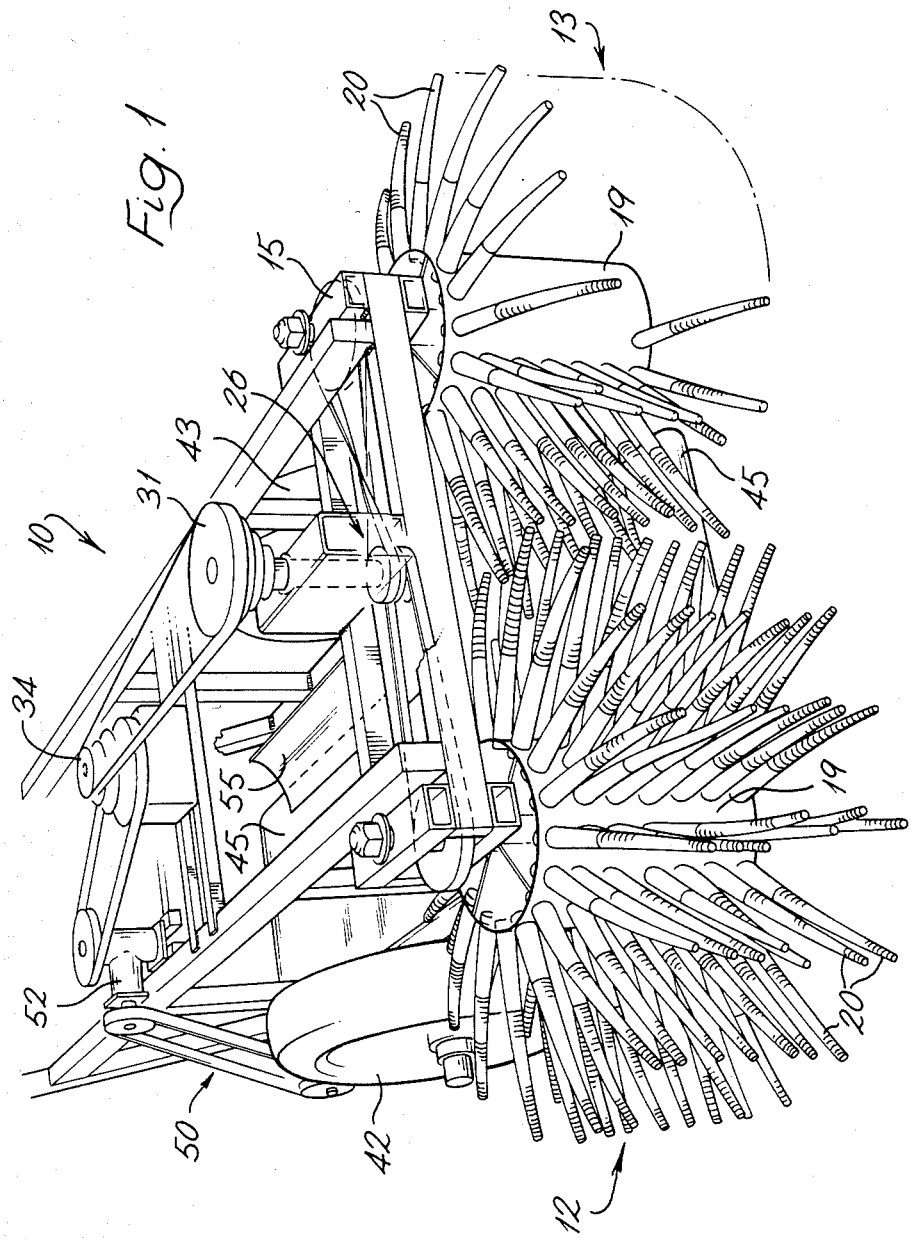

United States Patent [19]

Berry et al.

[11] Patent Number: 4,508,062
[45] Date of Patent: Apr. 2, 1985

[54] POULTRY-HARVESTING ASSEMBLY

[75] Inventors: Paul S. Berry, Bromham; Peter J. Kettlewell, Didsbury; Michael J. B. Turner, Clophill, all of England

[73] Assignee: National Research Development Corporation, London, England

[21] Appl. No.: 545,260

[22] Filed: Oct. 25, 1983

[30] Foreign Application Priority Data

Oct. 29, 1982 [GB] United Kingdom ................. 8230964

[51] Int. Cl.³ ............................................ A01K 29/00
[52] U.S. Cl. .................... 119/82; 56/328 R
[58] Field of Search ........... 119/82; 56/328 R, 327 R; 130/30 D

[56] References Cited

U.S. PATENT DOCUMENTS

| 2,300,157 | 10/1942 | Hunt | 130/30 D |
| 3,672,335 | 6/1972 | Sanders | 119/82 |
| 3,805,744 | 4/1974 | Jochum | 119/82 |
| 3,821,987 | 7/1974 | Shepardson et al. | 56/327 R |
| 3,921,723 | 11/1975 | Seem | 56/327 R |
| 4,290,820 | 9/1981 | Swisher et al. | 56/328 R |

FOREIGN PATENT DOCUMENTS 2411106 8/1979 France .................................. 119/82

Primary Examiner—Hugh R. Chamblee
Assistant Examiner—Kris R. Schulze
Attorney, Agent, or Firm—Cushman, Darby & Cushman

[57] ABSTRACT

A poultry-harvester 10 (FIG. 1) for use in a poultry house comprises two contra-rotating rotors 12, 13 arranged side by side with the flexible fingers 20 of each rotor abutting and/or intermeshing with the fingers 20 of the other rotor. In operation, as the harvester is driven towards the birds to be harvested, the two rotors are rotated in opposite directions to one another so that the fingers 20 co-operate to carry birds between the two rotors and deposit them on the conveyor belt 45.

14 Claims, 6 Drawing Figures

POULTRY-HARVESTING ASSEMBLY

The present invention relates to a poultry-harvesting assembly e.g. for harvesting birds from the litter in a broiler or rearing house.

At the present time, poultry is always harvested manually. However apart from the high cost of labour involved, excessive bruising of the birds can often occur resulting in downgrading or somtimes the death of the birds in transit.

It is an object of the invention to provide a more efficient and humane means for harvesting poultry in these conditions.

According to the present invention, a poultry harvester e.g. for harvesting chickens from the litter in a broiler house, comprises two rotors arranged side by side with each rotor providing a continuous array of radially extending guide elements closely adjacent and-/or abutting and/or intermeshing with the guide elements of the other rotor, and drive means for contra-rotating the two rotors about vertical or predominantly vertical axes so that the guide elements co-operate to transmit birds between the two rotors to a discharge location.

In one embodiment, for example, the harvester is mounted on ground wheels, casters, gantry or tracks for movement towards the birds to be harvested in which case the discharge location is to the rear of the two rotors.

Conveniently, the guide elements comprise an array of flexible fingers e.g. of the sort currently used for plucking the feathers from chicken carcasses.

Conveniently, baffles on the discharge side of the rotors are positioned to ensure that the harvested birds will be discharged rearwardly of the rotors. When the guide elements comprise flexible fingers, for example, the baffles may take the form of rigid or semi-rigid comb members interdigitating with these fingers.

Conveniently, at least during operation of the harvester, the rotation axes of the rotors will be inclined to enable the contra-rotating rotors to lift the birds off the ground as they move towards the discharge location e.g. for discharge on to an endless conveyor located behind the rotors.

Conveniently, additional rotors are provided at the side and/or in front of said two rotors and act to bring the birds into said two rotors. In one such case, the birds can be collected with a scanning movement as well as a forward movement by controlling the direction of the additional rotors. In another case, the rearward end of the harvester is pivoted and the conveyor is extendable.

Conveniently, the rotors are belt-driven from the drive means so as to allow belt slip in the event that the rotors become overloaded.

Figure 2:
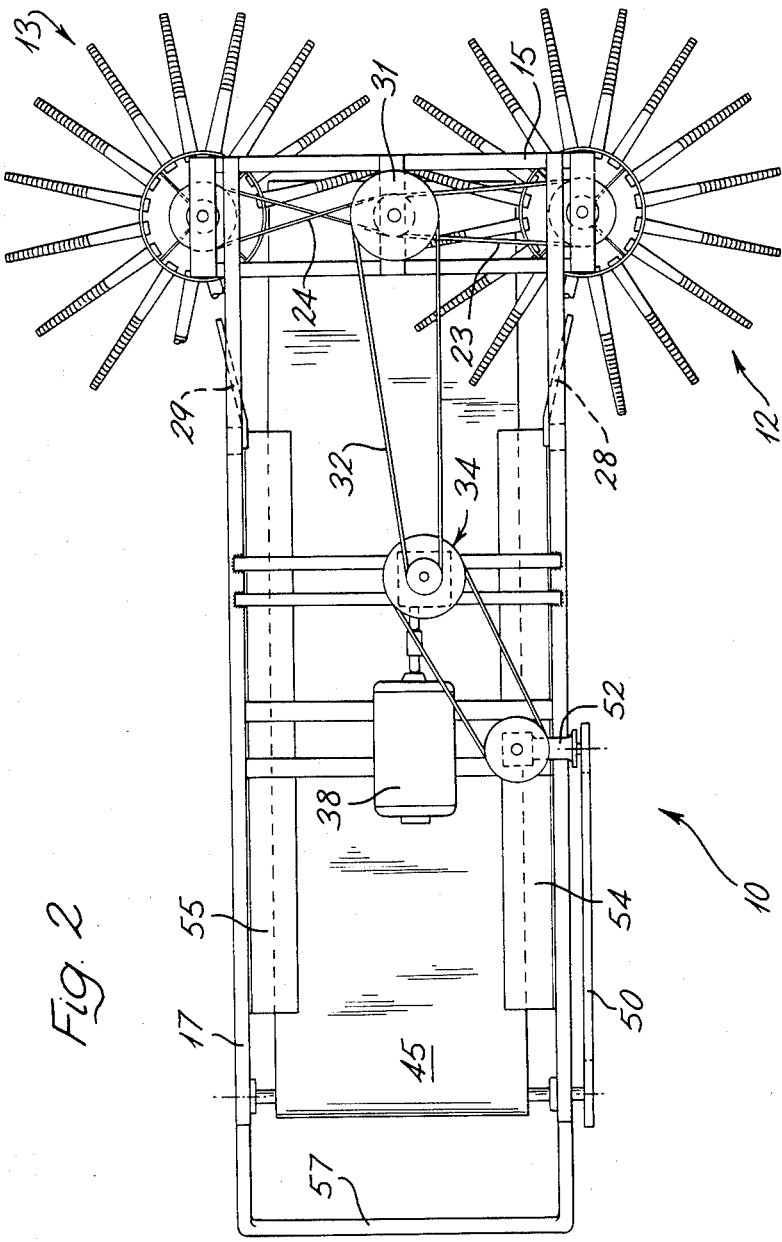
Figure 3:
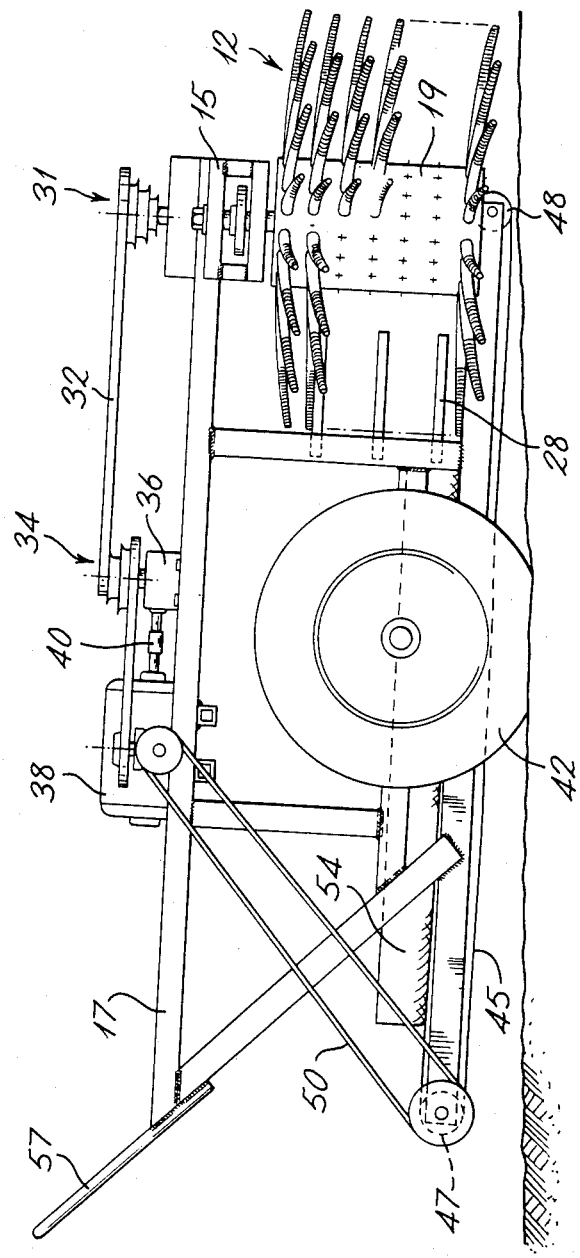
Figure 4:
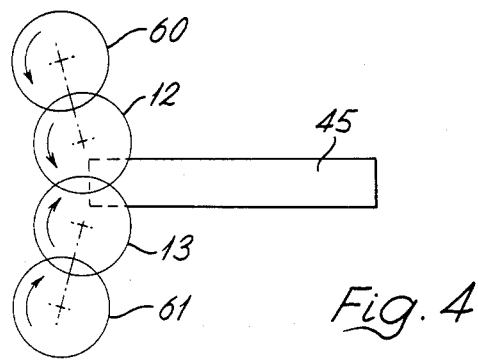
Figure 5:
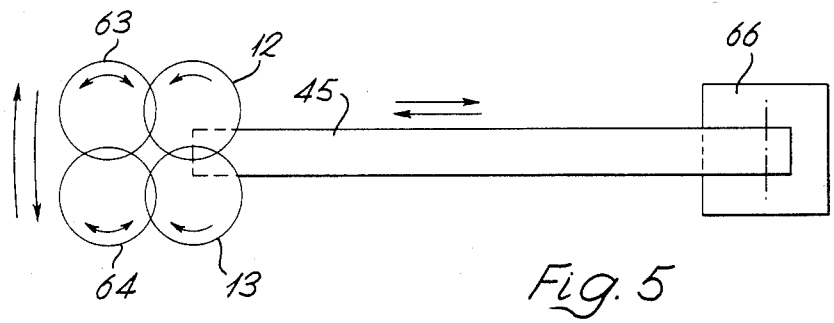
Figure 6:
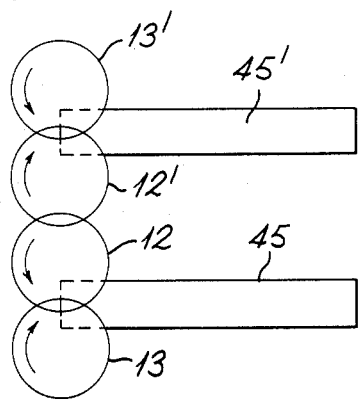

Embodiments of the invention will now be described, by way of example only, with reference to the accompanying drawings in which FIG. 1 is a perspective view looking rearwardly from the front of a mobile poultry-harvester in accordance with the invention;

FIGS. 2 and 3 are simplified plan and side views of the same assembly; and FIGS. 4, 5 and 6 are diagrammatic plan views of alternative embodiments.

Thus referring now to the drawings, a mobile bird-harvester 10 in accordance with the present invention comprises two rotors 12,13 mounted on a sub-frame 15 at the front end of the harvester chassis 17.

The rotors 12,13 take the form of drum members 19 (FIG. 1) each carrying an array of flexible rubber fingers 20 of the sort currently used for plucking chicken carcasses.

As will be seen from the drawings, each finger comprises a smooth root portion adjacent drum member 19 and a corrugated end portion. Typically the fingers will taper from an initial diameter of about 25 mm to a final diameter of about 12 mm at the tip. The overall finger length is typically about 235 mm giving rise to an overlap of about 50 mm at the position of maximum intermesh between the two rotors. The resilient nature of the finger material allows the fingers 20 to be pushed into appropriate apertures in the two drum members as shown in FIG. 2, a peripheral groove in the root portion of each finger ensuring that the finger locks securely into place in the drum aperture.

The rotors 12,13 are driven by vee-belts 23,24 from two centrally-located pulleys 36 (FIG. 1) mounted on a common shaft, one belt being crossed and the other not so as to give the desired contra-rotation of the two rotors.

At its upper end, the shaft carries a stepped pulley assembly 31 driven by another V-belt 32 from a similar but inverted assembly 34. This latter assembly is mounted on the output shaft of a right-angled gear box 36. The drive assembly is completed by an electric motor 38 connected to the input shaft of the gear box 36 by a coupling 40.

Reference numerals 28,29 indicate two combs which are secured to the harvester chassis to ensure that the harvested birds are discharged rearwardly.

The V-belt drive system described above ensures that should the rotors 12,13 become overloaded, the belts can slip about their pulleys so as to allow the rotors to stop rotating or to rotate at a lesser speed.

Reference numerals 42,43 indicate the ground wheels on which the harvester will move forward. As can be seen from FIG. 3, during use, the chassis 17 is tipped forwardly on these wheels so that rotors 12,13 will operate to lift the birds off the ground for discharge on a conveyor belt 45.

For the avoidance of doubt, it should be pointed out that FIG. 2 is a plan view of the harvester when disposed horizontally.

Indeed, in an alternative embodiment (not shown), the harvester will remain horizontally disposed throughout its operation and the desired lifting action of the two rotors is achieved by having the rotor axes upwardly and forwardly inclined away from the central conveyor belt.

Returning now to the illustrated embodiment, it will be seen that the belt 45 is mounted on two transverse support rollers 47,48, the roller 47 being driven through a belt arrangement 50 from a right-angled gear box 52 itself driven from the stepped pulley 34.

The conveyor belt assembly is completed by two side-wall curtains 54,55 running most of the length of the belt 45. As best seen from FIG. 1, the upper edge regions of the curtains are secured to the chassis 17 and their lower edge regions are loosely supported by the upper face of belt 45.

The harvester is completed by a push handle 57 which additionally carries the usual manual controls (not shown) for motor 38.

In operation, the operator tilts the harvester forwards as shown in FIG. 3 and the motor 38 is started to contra-rotate rotors 12,13. The harvester 10 is then pushed towards the birds and the contra-rotating rotors gently lift the birds on to the conveyor belt 45. The rearwardly-moving belt discharges the birds on to a crating platform (not shown) at the rear of the harvester.

Although the harvester is still at the prototype stage, it is envisaged that a suitable forward speed for the harvester might be about 3 meters/minute with a rotation speed of 40 rpm for rotors 12,13 and a rearward speed (relative to the harvester chassis) of about 100 meters/minute for conveyor belt 45.

With the dimensions and operational speeds indicated above, it is envisaged that a harvesting capacity of about 100 birds per minute might be attained with a typical broiler-house bird distribution of 20 birds per square meter.

In alternative embodiments (not shown), the harvester might advantageously be motorised rather than pushed by hand. Other possible features in future machines include the use of four rotors side by side, the outer two of which serve to sweep birds in towards the two central rotors which lift the birds onto the conveyor. On such arrangement is shown in FIG. 4 where the sweeping rotors are identified by reference numerals 60,61.

Another possible embodiment is the use of four rotors set in an approximately square formation (FIG. 5). The rear two rotors 12,13 lift birds up onto the conveyor 45 as described above. The direction of rotation of the front rotors 63,64 can be altered so that by sweeping the harvester from side to side birds can be picked up as well as by moving forward. In such an embodiment the rearward end of the harvester might be pivoted at a point on the catching platform (66) and the conveyor made extendable so that the harvester could scan in an arc advancing slowly forward at the end of each sweep.

In another embodiment, a harvester with four rotors which scans linearly from side to side before advancing forward may be envisaged.

In another embodiment (FIG. 6), a double headed harvester is envisaged, in which the rotors 12,13 and belt 45 of the earlier embodiments are duplicated at 12',13' and 45' respectively.

We claim:

1. A poultry-harvester, comprising: a mobile support;
   two rotors arranged side by side for rotation about substantially vertical axes; means for mounting said rotors to said support;
   a continuous array of radially-extending flexible guide elements provided on each rotor, said guide elements of one rotor extending towards the guide elements of the other rotor in close proximity therewith defining a bird-accepting region between the two rotors; and
   drive means for contra-rotating said two rotors about said substantially vertical axes whereby poulty in said bird-accepting region are moved rearwardly of the harvester.

2. A poultry-harvester as claimed in claim 1 mounted for movement towards the birds to be harvested in which the discharge location is to the rear of the two rotors.

3. A poultry-harvester as claimed in claim 1 in which the guide elements comprise an array of flexible fingers.

4. A poultry-harvester as claimed in claim 1 in which baffles on the discharge side of the rotors are positioned to ensure that the harvested birds will be discharged rearwardly of the rotors.

5. A poultry-harvester as claimed in claim 4 in which the guide elements comprise an array of flexible fingers and the baffles take the form of rigid or semi-rigid comb members interdigitating with said fingers.

6. A poultry-harvester as claimed in claim 1 in which, at least during operation of the harvester, the rotation axes of the rotors will be inclined to enable the contra-rotating rotors to lift the birds off the ground as they move towards the discharge location.

7. A poultry harvester as claimed in claim 6 in which the rotors are operative to discharge the birds on to an endless conveyor located behind the rotors.

8. A poultry-harvester as claimed in claim 7 in which at least one additional rotor is provided adjacent said two rotors and acts to bring the birds into said two rotors.

9. A poultry-harvester as claimed in claim 8 in which birds can be collected from a scanning movement as well as a forward movement by controlling the direction of rotation of said at least one additional rotor.

10. A poultry-harvester as claimed in claim 8 in which said at least one additional rotor is adapted for rotation by the drive means about a substantially vertical axis and provides a continuous array of radially extending guide elements which co-operate with the guide elements of adjacent rotors.

11. A poultry-harvester as claimed in claim 10 in which two said additional rotors are provided so as with said two rotors to lie in a V-formation when viewed in plan.

12. A poultry-harvester as claimed in claim 10 in which two said additional rotors are provided so as with said two rotors to lie in a square or rectangular formation when viewed in plan.

13. A poultry-harvester as claimed in claim 8 in which the rearward end of the harvester is pivoted on a catching platform, the conveyor being extendable.

14. A poultry-harvester as claimed in claim 1 in which the rotors are belt-driven from the drive means so as to allow belt slip in the event that the rotors become overloaded.

* * * * *